(12) United States Patent
Johnson et al.

(10) Patent No.: US 11,803,799 B2
(45) Date of Patent: Oct. 31, 2023

(54) SYSTEM AND METHOD FOR INVENTORY MANAGEMENT AND PRODUCTION COST ESTIMATION IN PAPER CONVERTING ENVIRONMENTS

(71) Applicant: PaperSoft 2.0, LLC, Pelham, AL (US)

(72) Inventors: Thomas Johnson, Pelham, AL (US); James Smith, Irondale, AL (US); Larry Paul Smith, Alabaster, AL (US); Catherine Harrison, Pelham, AL (US); Janice Porter, Medway, MA (US)

(73) Assignee: PaperSoft 2.0, LLC, Pelham, AL (US)

( * ) Notice: Subject to any disclaimer, the term of this patent is extended or adjusted under 35 U.S.C. 154(b) by 20 days.

(21) Appl. No.: 17/103,982

(22) Filed: Nov. 25, 2020

(65) Prior Publication Data

US 2022/0164749 A1    May 26, 2022

(51) Int. Cl.
*G06Q 10/0637* (2023.01)
*G06Q 30/0601* (2023.01)
*G06Q 10/0631* (2023.01)
*G06Q 10/1091* (2023.01)
*G06Q 10/0875* (2023.01)
*G06Q 30/0201* (2023.01)
*G06Q 50/04* (2012.01)
*G05B 19/416* (2006.01)

(52) U.S. Cl.
CPC ..... *G06Q 10/06375* (2013.01); *G05B 19/416* (2013.01); *G06Q 10/06315* (2013.01); *G06Q 10/0875* (2013.01); *G06Q 10/1091* (2013.01); *G06Q 30/0206* (2013.01); *G06Q 30/0621* (2013.01); *G06Q 50/04* (2013.01); *G05B 2219/36287* (2013.01)

(58) Field of Classification Search
CPC ....... G06Q 10/06375; G06Q 10/06315; G06Q 10/0875; G06Q 10/1091; G06Q 30/0206; G06Q 30/0621; G06Q 50/04; G05B 19/416; G05B 2219/36287
USPC ........................................................ 705/7.25
See application file for complete search history.

(56) References Cited

U.S. PATENT DOCUMENTS 5,114,539 A * 5/1992 Penniman ............. D21F 11/004
162/204
5,667,620 A * 9/1997 Grigsby .................. B32B 29/08
156/254

(Continued)

FOREIGN PATENT DOCUMENTS

WO    WO-2007008786 A1 *  1/2007  ............. D21H 19/00

*Primary Examiner* — Abdallah A El-Hage Hassan
(74) *Attorney, Agent, or Firm* — Outlier Patent Attorneys, PLLC

(57) ABSTRACT

The present disclosure is for a system and a method for processing requests for custom paper products and estimating costs associated with manufacturing the custom paper products. Specifically, the present invention is an inventory management, yield and cost estimation system and method for use by a paper converting company. The system and method involves determining the output requirements of a custom paper product, determining the available inventory which can be converted into the custom paper products, the available machines and an appropriate converting process to perform the converting and estimating the yield, production time and production cost associated with a given set up for making the custom paper products.

19 Claims, 7 Drawing Sheets

(56) References Cited

U.S. PATENT DOCUMENTS

| | | | | |
|---|---|---|---|---|
| 6,985,790 | B2* | 1/2006 | Begemann | D21G 9/0009 |
| | | | | 162/263 |
| 8,827,406 | B1* | 9/2014 | de Jong | B41J 11/0095 |
| | | | | 347/14 |
| 10,255,572 | B2* | 4/2019 | Azad | D21G 9/0027 |
| 2003/0187808 | A1* | 10/2003 | Alfred | G06Q 30/06 |
| | | | | 705/400 |
| 2008/0060774 | A1* | 3/2008 | Zuraw | D21H 19/42 |
| | | | | 106/204.3 |
| 2014/0162862 | A1* | 6/2014 | Shimura | B31B 50/00 |
| | | | | 493/56 |
| 2015/0184342 | A1* | 7/2015 | Saas | D21H 1/02 |
| | | | | 162/132 |
| 2020/0063351 | A1* | 2/2020 | Everett | D21H 13/06 |
| 2020/0082308 | A1* | 3/2020 | Harnesk | G06Q 50/04 |
| 2021/0365880 | A1* | 11/2021 | Garay | G06Q 10/04 |

* cited by examiner

SYSTEM AND METHOD FOR INVENTORY MANAGEMENT AND PRODUCTION COST ESTIMATION IN PAPER CONVERTING ENVIRONMENTS

CROSS-REFERENCE TO RELATED APPLICATIONS

None

BACKGROUND

Field of the Art

The disclosed invention is generally related to the process of converting input paper products into output paper products in a large scale conversion facility. The invention can also involve converting films and foils.

Discussion of the State of the Art

Paper conversion process (i.e. converting a paper product into another paper product) is unlike traditional manufacturing process. For example, traditional manufacturing relies on bill of materials and inventory lists to assemble products, identify inventory constraints, identify number of output items, etc. However, in paper conversion, a number of input paper items may be converted into a number of different output paper products. As such, paper conversion process is highly flexible. In other words, a variety of different input paper items may be converted into a variety of different output paper products; as such, the use of a bill of materials is impractical given the nature of the numerous inventory items and varying characteristics which may be present in said inventory. In paper converting, in order to produce a given output item, there may not be a fixed set of input items that would be required to manufacture a custom output item. For example, unlike a typical manufacturing setting, where parts A, B and C are always combined to manufacture product X such that X is the same every time, paper converting to produce a paper product is very different. Every paper converting job is unique and products are manufactured on demand to meet custom specifications such that no bill of materials can be established in advance (i.e. no inventory of parts A, B, C, etc.).

In addition, the base input unit for paper converting is a jumbo paper roll and no two paper rolls are exactly alike so part number systems cannot be used efficiently to track inventory. For example, every paper roll has at least 11 characteristics including grade, thickness, basis weight, weight, linear measure, width, length, diameter, core, quality, condition and mill source. Furthermore, each paper roll may have at least 6 additional attributes including color, coating, printing, perforation, embossing, and lamination. As a result, there are trillions of possible variations of paper products which can be converted into other paper products and in order to use a standard bill of materials type system, one would need to define trillions of part numbers to track inventory which simply is not practical. Therefore, in paper converting each inventory item (e.g. each paper roll) must be received, classified, costed and tracked individually and there are no known systems for achieving this.

Furthermore, there is no direct correlation between raw materials (e.g. a paper roll) and finished goods as there is in a typical manufacturing setting. Nearly any input roll can be used to make nearly any finished good and nearly any finished good can be made from a variety of different input rolls. Once again, a bill of materials system cannot be appropriately set up for this scenario in order to track inventory or determine the cost of an end product. Instead, a cost analysis needs to be done for each custom job depending on numerous factors such as characteristics of available inventory and converting machine characteristics among others as will be discussed in detail below.

Current paper converting facilities often rely on in house developed methods of inventory management and cost estimation. Much of this is dependent on the employed personnel having extensive experience in the paper converting industry in order to yield some degree of optimization and efficiency, however user error and imperfections may still be present.

SUMMARY

The present invention overcomes these limitations by providing a way to track, cost and classify each item a paper converter may have in inventory without the use of a bill of materials or part numbers.

The present invention also allows for cost estimation for custom products based on the specified output requirements, available inventory characteristics, converting machine characteristics, and the process(es) necessary to produce the custom product which current systems do not allow.

Furthermore, the present invention eliminates user error and guessing associated with conventional paper converting approaches to yield more optimized, accurate and efficient inventory management and cost estimation.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
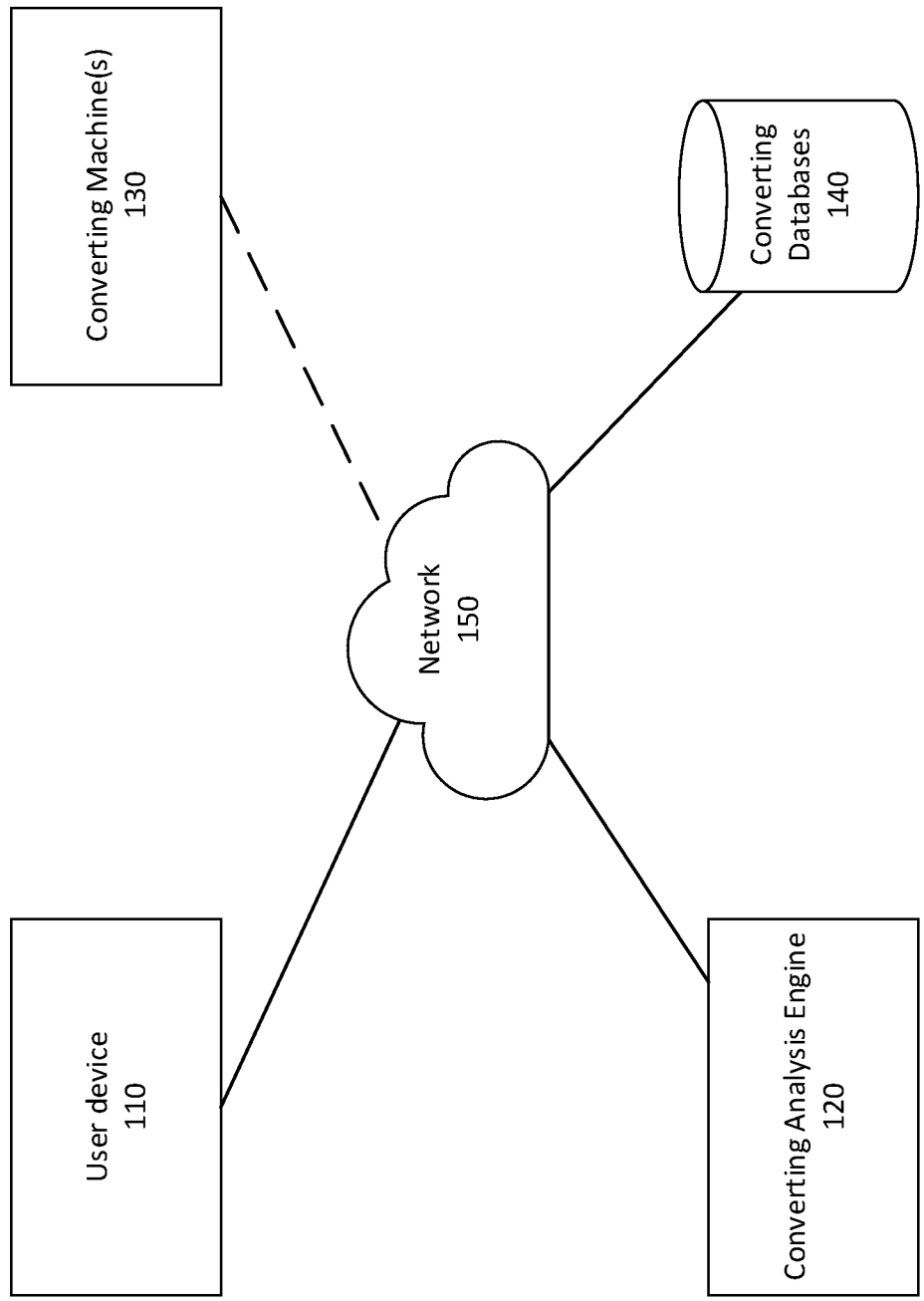
FIG. 1 illustrates a system for paper converting in accordance with an exemplary embodiment of the invention.

The inventive system and method (hereinafter sometimes referred to more simply as "system" or "method") described herein significantly reduces user error and guessing associated with conventional paper converting approaches to yield more optimized, accurate and efficient inventory management and cost estimation by providing a way to track, cost and classify each item a paper converter may have in inventory and may produce without the use of a bill of materials or part number system.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates an exemplary embodiment of a paper converting system according to one embodiment. The system includes a user device 110, a converting analysis engine 120, one or more converting machine(s) 130, converting databases 140, and a network 150 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

The converting machine(s) 130 convert input inventory items into output items. Input inventory items may include rolls, sheets, or patterns and output items may include rolls, sheets, or patterns. Output items may include finished products ready to be sold and shipped to a customer or finished products to be stored as inventory for a future use such as a future order for the same output item. Alternatively, output items may be intermediate, partially finished products to be stored for future use or to be immediately used as input inventory items by the same or a different converting machine 130 to make another output item. Each converting machine 130 may perform a single converting function or may perform multiple converting functions. For example, a sheeting machine may convert an input of rolls into an output of sheets, and a different machine (a laminating machine) may receive the sheets and laminate the sheets. Alternatively, a single machine may be designed to perform both sheeting and laminating. This is only one example of the types of machines and possible functions. A multitude of other machines and functions are included as described in more detail below. Generally, a machine may convert rolls to rolls, rolls to sheets, rolls to patterns, sheets to sheets, sheets to patterns, or patterns to patterns. In addition, a machine may add an attribute to the input inventory item such attributes including, but not limited to, color, coating, printing, perforation, embossing, lamination, folding and windowing. The converting capabilities of each machine are stored in converting databases 140.

The converting databases 140 store information about each machine, the various converting processes which can be performed, information about inventory items, and user defined tables including user created tables with custom information about a given machine, process and/or inventory item. The converting databases 140 provide the converting analysis engine 120 with the necessary information for the converting analysis engine 120 to analyze the process of converting input inventory items into output inventory items.

A user device 110 communicates with the network in order to request a particular output item. The user device 110 is generally a processor-based device such as a computer, cell phone, tablet, or the like. The request for a particular output item is received by the converting analysis engine 120 which in turn processes the request as described in more detail below. The user device 110 may be located on premises of the paper converting facility (i.e. a device that is internal to the facility) or may be remote from the paper converting facility (e.g. external to the facility). For example, a customer may use their own user device 110 (i.e. a customer based user device) to submit a request. As another example, a sales office for the paper converting company may receive requests via phone, email, postal mail, etc. and use a user device 110 located at a sales office to submit the request to the paper converting facility. Alternatively, the request may be submitted through a user device 110 located on premises of the paper converting facility (i.e. a device that is internal to the facility), such as in scenarios where requests are received via a phone call, email, or other communication sent to the paper converting facility in a form which is not directly communicated to the paper converting system. In these scenarios an employee of the paper converting company may use an internal user device 110 to submit the request to the paper converting system.

The converting analysis engine 120 receives a request for a particular output item from a user device 110 via the network and analyzes information from the converting databases 140 in order to determine requirements to satisfy the received request for a particular output item. The converting analysis engine 120 is generally a processor-based device such as a server, a desktop computer, cell phone, tablet, or the like. The converting analysis engine 120 performs a variety of computing functions to manage available inventory, compute expected yields and production costs associated with fulfilling the request for a particular output item, as described in detail below. The converting analysis engine 120 may be a standalone component or may be incorporated into other components of the system. For example, the entirety of the converting analysis engine 120 or any subcomponent or combination of subcomponents may be incorporated into converting machine(s) 130. For example, in one embodiment, the converting machine(s) 130 may include hardware and/or software necessary to incorporate the converting analysis engine 120 and any or all of its subcomponents so the converting analysis can be done directly through converting machine(s) 130. For example, a user interface on converting machine(s) 130 may allow for a user to interact with the machine to see and/or determine the outcomes of a given converting configuration such as yield, cost and production time.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a barcode scanner, a smart phone or tablet or other cellular or mobile phone, or gaming device, among other suitable computing devices. User devices 110 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access the network 110. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application 110 obtains data from the network 110 and displays it to the user within the application interface.

Exemplary user devices 110 are illustrated in some of the subsequent figures provided herein. This disclosure contemplates any suitable number of user devices 110, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to users devices or other devices in response to HTTP or other requests from users devices or other devices. A mail server is generally capable of providing electronic mail services to various users devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or users to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
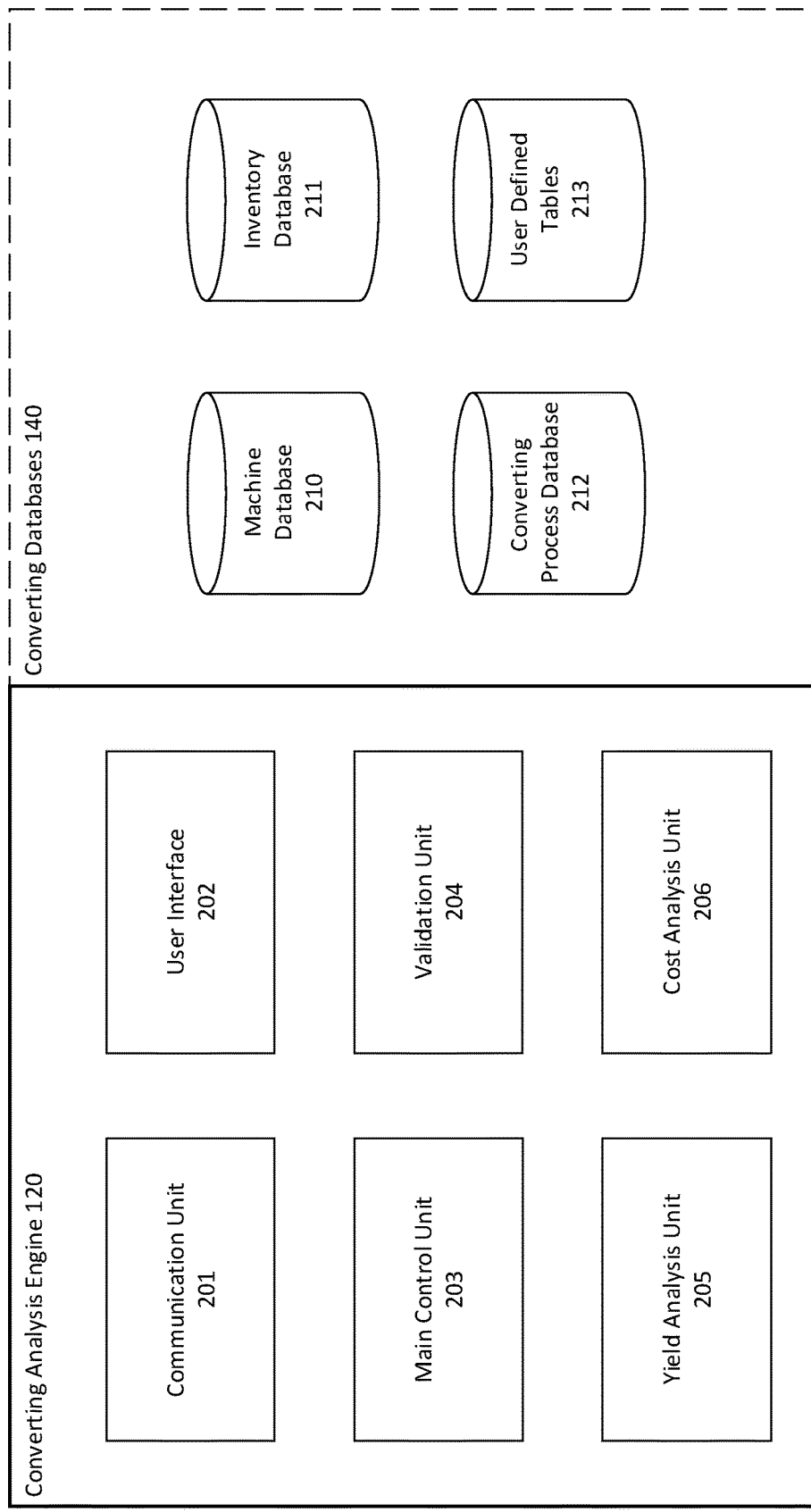
FIG. 2 illustrates one embodiment of the components involved in a paper converting system in accordance with an exemplary embodiment of the present invention.

FIG. 2 illustrates an exemplary embodiment of the converting analysis engine 120 of a paper converting system. The converting analysis engine 120 includes a communication unit, a user interface 202, a main control unit 203, a validation unit 204, a yield analysis unit 205 and a cost analysis unit 206. The converting analysis engine 120 may also include one or more converting databases 140 or alternatively one or more converting databases 140 may be in a different location and the converting analysis engine 120 and its sub-units may access the converting databases 140 remotely as needed. The converting databases 140 include a machine database 210, inventory database 211, converting process database 212, and user defined tables 213.

The communication unit receives incoming communications. Generally, this may include receiving a request for a custom output item. This custom output item may be a custom paper product, custom foil product, custom film product or the like. The request may be received via network. Alternatively, a user may trigger actions of the converting analysis engine 120 via the user interface 202 without the need for receiving an external communication input at the communication unit.

The main control unit 203 controls the overall operation of the converting analysis engine 120 as well as controlling the sub-units of the converting analysis engine 120 including at least the validation unit 204, yield analysis unit 205, cost analysis unit 206 as well as controlling outputs to the user interface 202 and receiving input from the user interface 202. In addition, the main control unit 203 can retrieve information from the converting databases 140 as well as update the information stored within each of the converting databases 140. The main control unit 203 is generally a processor-based component and may be hardware and/or software as described in more detail below.

The user interface 202 presents information to a user and is configured to receive input from a user. The user interface 202 may include a plurality of different user interface 202 displays depending on information received from the main control unit 203 related to the information necessary to analyze the requirements to fulfill a received request for a custom paper product. The user interface 202 may include different display areas related to various aspects including, but not limited to, the output requirements, the input inventory available, the input inventory selected for a given converting process, the machine selected for a given converting process and the selected machines operating characteristics.

The inventory database 211 stores information about the status of inventory available to a paper converting company. This information may include information about available finished products (previous inventory input items converted into output items) which could be used in their present condition to fulfill a received request for an output item. This information may also include information about available unfinished products or raw materials which are available to be converted into an output item to fulfill the received request for a custom output item. The typical characteristics of an input inventory item include, but are not limited to, grade, thickness, basis weight, weight, linear measure, width, length, diameter, core, quality, condition and mill source. Additionally, an input inventory item may also include, but not limited to, at least one of the following attributes: color, coating, printing, perforation, embossing, lamination, folding and windowing.

The machine database 210 stores information about the various converting machines 130 available for performing a converting process. A paper converting company may have a variety of converting machines 130 that each perform different functions as well as converting machines 130 that perform multiple functions. The machine database 210 serves to store all the information about the various converting machines 130 such as machine availability/scheduled usage, machine characteristics such as speed, capabilities of the machine such as cutting/sheeting, ability to add an attribute such as printing, laminating, etc. The machine database 210 provides necessary information to the main control unit 203 as needed for analyzing the converting requirements needed to fulfill a received request for an output item.

The converting process database 212 stores information about the different converting processes that can be performed. As mentioned above these processes generally may include converting rolls to rolls, rolls to sheets, rolls to patterns, sheets to sheets, sheets to patterns and patterns to patterns. These may generally be referred to as the master processes which can be performed by a given machine. Alternatively, converting processes may be defined by the relationship between the output item category and the input item category. For example, a master process that converts rolls to sheets may be considered a sheeting process, while a master process that converts sheets to sheets may be considered a trimming process. As another example, a patterning process can be defined as any of the above master processes that results in an output of patterns such as rolls to patterns, sheets to patterns, or patterns to patterns. Finally, a rewinding and/or sawing process may be defined as the above process which converts rolls into rolls, wherein further user input and/or available machinery may dictate whether the rewinding and/or sawing process is used. In addition, the converting processes database may include processes related to adding attributes to input inventory items, wherein the processes include, but are not limited to, coloring, coating, printing, perforating, embossing, laminating, folding and windowing.

The user defined tables 213 are custom tables that store a variety of information associated with various aspects of the converting system. User defined tables 213 are custom tables of information that allow a paper converter to customize paper converting as they see fit. For example, user defined tables 213 may allow units to be user defined such that items can be bought, made and sold in an unlimited number of unit combinations. For example, a given paper converter may wish to stock and sell sheets by the skid, by the sheet, per 1000 sheets, by weight, etc. and the use of user defined tables 213 for units will allow the converter to stock, produce, track and sell products according to their preferred unit. Also, the user defined tables 213 may include a table for metric to imperial conversion and vice versa so that a paper converter may adapt to different measurement systems to better accommodate a variety of customers. As another example, the user defined tables 213 may include user defined grades to provide further functionality allowing the user to define how basis weight is calculated for a given grade.

The validation unit 204 validates information received to ensure an output item can appropriately be created from the received information. For example, based on identified inventory input items, a selected converting machine 130 and the machine's characteristics, a selected converting process, optionally information in user defined tables 213, and information about the output item requirements, the validation unit 204 determines whether the output item can be successfully produced. The validation unit 204 may also validate that a given converting plan will produce the specified output item while maintaining waste below a predetermined threshold.

The yield analysis unit 205 processes received information to determine the output yield. For example, based on identified inventory input items, a selected converting machine 130 and the machine's characteristics, a selected converting process, optionally information in user defined tables 213, and information about the output item requirements, the yield analysis unit 205 determines the quantity of output items that would be produced for that given scenario.

The cost analysis unit 206 processes received information to determine the cost of producing an output item. For example, based on identified inventory input items, a selected converting machine 130 and the machine's characteristics, a selected converting process, optionally information in user defined tables 213, and information about the output item requirements, the cost analysis unit 206 determines the cost of output items that would be produced for that given scenario. This cost analysis may include multiple factors such as machine run time, machine preparation time, waste produced, input inventory items material cost and labor and operator costs.

Each of the above mentioned components of the converting analysis engine 120 and converting databases 140 will be described in more detail with the corresponding processes discussed in FIG. 3 below.

Figure 3:
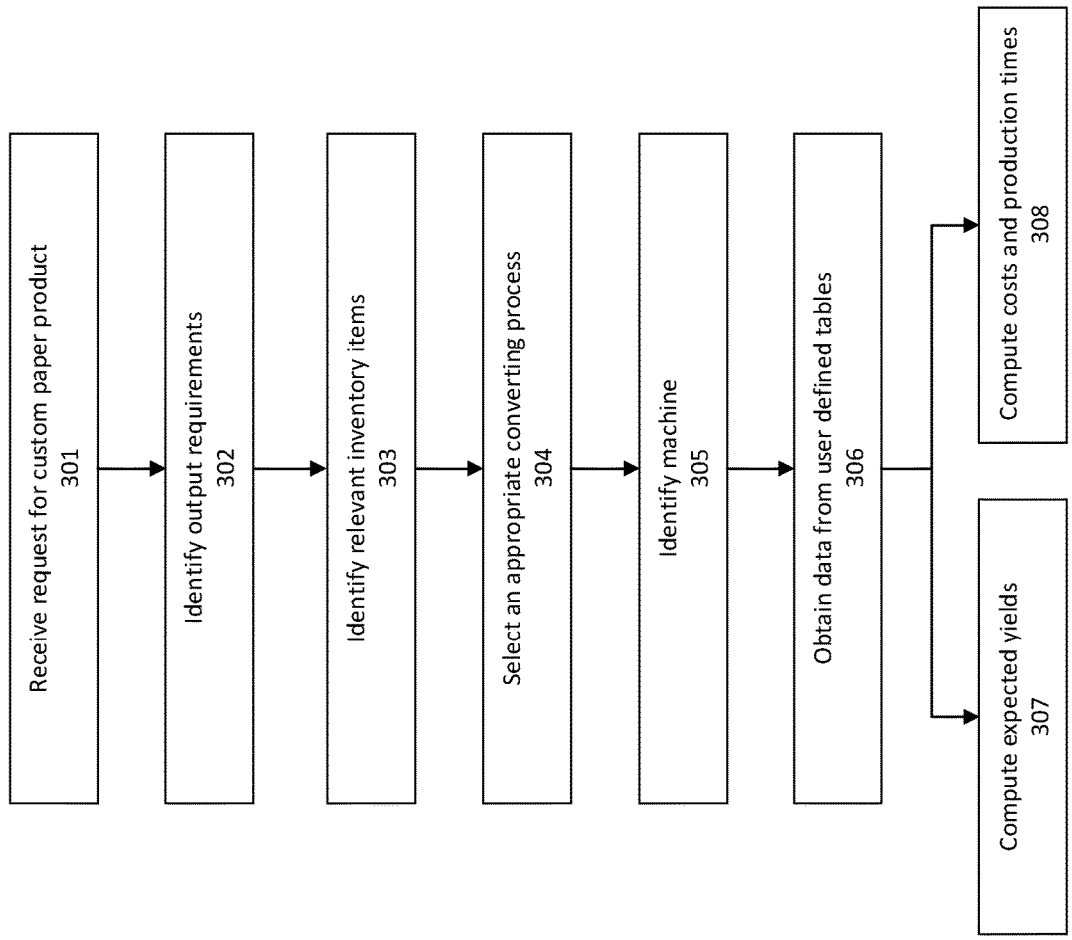
FIG. 3 illustrates one embodiment of a process for paper converting in accordance with an exemplary embodiment of the present invention.

FIG. 3 illustrates an exemplary process for converting input inventory items into output items. In this particular embodiment, the invention is directed towards output items which are custom paper products. At step 301, a request for a custom paper product is received. This request for a custom paper product is processed at step 302 in order to identify the output requirements necessary to fulfill the request for a custom paper product. The next three steps (steps 303, 304 and 305) can be done in varying orders depending on preference, however for sake of simplicity, this discussion will be focused on the order depicted in FIG.

3. In addition, in certain scenarios some steps may not be required depending on available inventory and the output requirements of the request for the custom paper product. Once the output requirements have been identified, relevant inventory items which can be used as input inventory items to produce output items with the identified output requirements are identified at step 303. At step 304, an appropriate converting process is selected that can produce the identified output requirements. Once the converting process is selected, machines capable of performing the selected converting process are identified at step 305. Optionally, the process may obtain data from user defined tables 213 at step 306. At steps 307 and 308 the process proceeds to use the above identifications and selections to compute expected yields and/or compute costs and production time associated with producing the requested custom paper products.

Alternate variations to the order of steps depicted in FIG. 3 can include identifying output requirements, then selecting a converting process first, such as sheeting, then identifying which machines can produce sheets, then identifying what type of input these sheeting machines require, then identifying relevant inventory items, then proceeding to the remaining steps. Another variation can include identifying output requirements, identifying machines first, then selecting converting processes, then identifying inventory items. These examples are not meant to be limiting and any conceivable order of the steps in FIG. 3 is included in the invention. In addition, the steps do not need to be done sequentially and one completed before the next begins as these steps could be executed simultaneously.

Returning to step 301, a request for a custom paper product is received. This request may take several different forms. For example, an electronic request from a user device 110 of a customer/client may be transmitted via network 150 and received at the communication unit of the converting analysis engine 120. Alternatively, this request may be received by a salesperson such as via a phone call and the request relayed to the converting analysis engine 120 in an appropriate fashion for further processing. Other variations of the request and its reception are included and the particular means of receiving the request is not limited to the above, as any form of request for a custom paper product may be received and processed within the scope of the invention.

At step 302, the output requirements for the custom paper product are determined. This may include requirements of the paper characteristics including but not limited to at least one of grade, basis weight, size (length and width), caliper (thickness) and paper attributes including but not limited to at least one of coloring, coating, printing, perforating, embossing, laminating, folding and windowing. The output requirements can be determined by the main control unit 203 based on the request received by the communication unit or determined from input entered via user interface 202. Alternatively, the output requirements may be directly specified via the user interface 202 and then provided to the main control unit 203.

Moving to step 303, relevant inventory items which are capable of being converted into output items having the output requirements of the custom paper product are identified and may be considered as input inventory items. In some embodiments, step 303 may comprise identifying input inventory items with minimum characteristics capable of being converted into output inventory items having the one or more output requirements for the custom paper product. This may be accomplished via main control unit 203 obtaining information from the inventory database 211 and identifying relevant inventory items based on the characteristics and attributes of the inventory items. Only those inventory items which are capable of being converted into output items having the output requirements will be considered as input inventory items for a converting process and further analysis while other inventory items are excluded from further analysis.

In some scenarios there may be existing inventory items which already have the output requirements of the custom paper product. In these scenarios, it may or may not be necessary to perform any converting process depending on the quantity available in inventory and the quantity required by the received request. For example, if a request for 10,000 sheets of a given grade, basis weight, size and caliper is received and the main control unit 203 determines there are at least 10,000 of such sheets in inventory, the main control unit 203 determines that no converting is required and that the request can be processed. This can include designating the inventory item as a finished good ready for shipping. In addition, as a result of the inventive concept herein and as further discussed herein, the converting analysis engine 120 does not need to perform the step of computing cost and production time for this inventory item since that would have been done during a previously executed converting and the cost information would be stored in the inventory database 211 associated with this inventory item. Therefore, the main control unit 203 can simply access this cost information in the inventory database 211, determine the cost to fulfill the request for the custom paper product, add a profit margin and generate a quote for the custom paper product.

In the more common scenario where existing inventory items do not have the requirements of the custom paper product, the process proceeds to step 304 to select an appropriate converting process(es) for the identified inventory items. Following along with the example above where a request for 10,000 sheets of a given grade, basis weight, size and caliper is received, the main control unit 203 can access the converting process database 212 to select appropriate converting processes that will yield sheets. This may include selecting appropriate master processes which in this case would include the rolls to sheets and sheets to sheets master processes.

In addition, the main control unit 203 may determine if a multi-step converting process is required. For example, altering the above scenario above to be a request for 10,000 printed sheets of a given grade, basis weight, size and caliper, the main control unit 203 may determine that both a sheeting process and a printing process are required. As a more complex example, in order to make a printed pamphlet one converting approach could include converting rolls to sheets, then converting sheets to printed sheets, then converting printed sheets to folded printed sheets. In other words, this would require a multi-process approach of a sheeting process followed by a printing process followed by a folding process in order to arrive at the final output item. Other variations, too numerous to list due to the trillions of variations of paper rolls/products as discussed above, are included within the scope of this invention.

Once the converting process(es) has/have been selected, the process proceeds to step 305 to identify converting machines 130 capable of executing the selected process(es). Based on the process(es) selected the main control unit 203 determines which converting machines 130 will be needed for the converting process(es). Part of this process may include obtaining a machine file from the machine database 210 indicating the capabilities of the converting machine 130. For example, one aspect included in this machine file may be machine speed. Converting machines 130 are typically rated by their linear measure per unit of time converting capability. However, this rating may assume ideal circumstances which may not coincide with the circumstances associated with making the requested custom paper product. Instead, the actual machine speed for a given job is dependent on multiple variables including the base machine speed rating, but also the input inventory item characteristics and output requirements.

In step 306, the main control unit 203 may optionally obtain information from user defined tables 213. As discussed above the user defined tables 213 include custom information which may be needed in order to appropriately compute expected yields, costs and production times.

Step 307, the main control unit 203 communicates with yield analysis unit 205 to determine the expected yields. This includes determining the total output that will be produced based on the identified inventory items, output requirements, converting machine(s) and selected converting process(es). This calculation may be measured in different ways such as quantity (e.g. total sheets) produced or weight produced for example. This calculation allows a user to determine if the converting conditions identified/selected above will provide sufficient output to fulfill the received request for the custom paper product or if additional converting may be required.

As an alternative, or in addition to step 307, step 308 involves computing production costs and production time. This computation is based on at least the identified input inventory items, output requirements, converting machine(s) and selected converting process(es). In addition, depending on the available inventory items and their characteristics and the output requirements, it may be necessary to use multiple input inventory items and to change machine input items during the converting. Therefore, the computation may include consideration of one or more of: number of input items, job startup time, input change time, output takedown time, input takedown time, input core change time and machine configuration change time. Each of these may require labor plus down time when machine is not running which need to be factored into the production cost and time.

In addition, depending on the output requirements and characteristics of the input inventory items, each machine will have an associated speed curve which identifies an optimal speed for the given output requirements. This speed will play an important role in determining production time and thus production cost. This machine speed curve can be stored in a machine file in the machine database 210.

In addition, although not depicted in FIG. 3, the process may also include a validation step. In this step the validation unit 204 is used to validate any or all of the following: that the input inventory items can be converted into output items with the required output characteristics, that the selected converting process is appropriate for the input inventory items and output requirements, and that the identified machine can perform the necessary converting. Should any of these yield an invalid determination, a notification would be provided to the main control unit 203 and/or user via user interface 202.

Furthermore, this validation performed by the validation unit 204 may also include validating that an appropriate quantity of output items will be made based on the identified input inventory items, output requirements, converting machine(s) and selected converting process(es). For example, the validation unit 204 may determine the output quantity that will be produced, compare with the output requirements of the request for the custom paper product and provide a notification indicating if the output quantity is sufficient or insufficient. If the output quantity is insufficient, additional input inventory items may be selected by the user to meet the necessary output quantity. In one embodiment, the main control unit 203 may filter the additional input inventory items based on available inventory. If the output quantity is sufficient and exceeds the output quantity a decision may be made by a user whether to proceed with converting the entirety of the selected input inventory item(s) or whether to stop the converting and leave a portion of the input inventory item(s) unconverted or change the converting criteria to convert the remainder of the selected input inventory item(s) into an alternate output item. In any of these embodiments, the main control unit 203 may compute the yield for a given scenario. In one embodiment, the main control unit 203 may be configured to automatically or semi-automatically perform the functions of the user such as selecting additional input inventory items, determining whether to convert the entirety of the selected input inventory item(s), whether to stop the converting and leave a portion of the input inventory item(s) unconverted, or whether to change the converting criteria to convert the remainder of the selected input inventory item(s) into an alternate output item. For example, in the sheeting example discussed above, if converting a roll to sheets to meet a request for 10,000 sheets, the converting may be configured to be stopped at a time when 10,000 sheets have been output thereby leaving a partial unconverted roll or the converting may be configured to continue converting beyond the output requirement of 10,000 sheets in which case the additional sheets could then be designated as input inventory items to be stored for another use. Alternatively, once the target 10,000 sheets have been made, the converting may be paused while machine configuration is changed in order to convert the remainder of the input inventory item(s) into an alternate output item.

Although described herein with particular reference to paper converting and custom paper products, the system can also be used in converting films or foils into custom output items in the same way that paper is converted as described above. In these embodiments, instead of the input inventory items comprising rolls, sheets, or patterns of paper, the input inventory items would comprise rolls, sheets, or patterns of films or foils.

In addition, although described herein as the process beginning with receiving a request for a custom paper product, the invention may be practiced without this step occurring. For example, the step may be replaced with simply determining a custom product to be made and its associated output characteristics. Under this scenario, rather than being used for fulfilling received orders, the disclosed invention can be used for planning and optimization purposes.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card. For example, the above described converting analysis engine and its sub-units may be implemented as hardware or a combination of hardware and software as described herein.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, barcode scanner, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
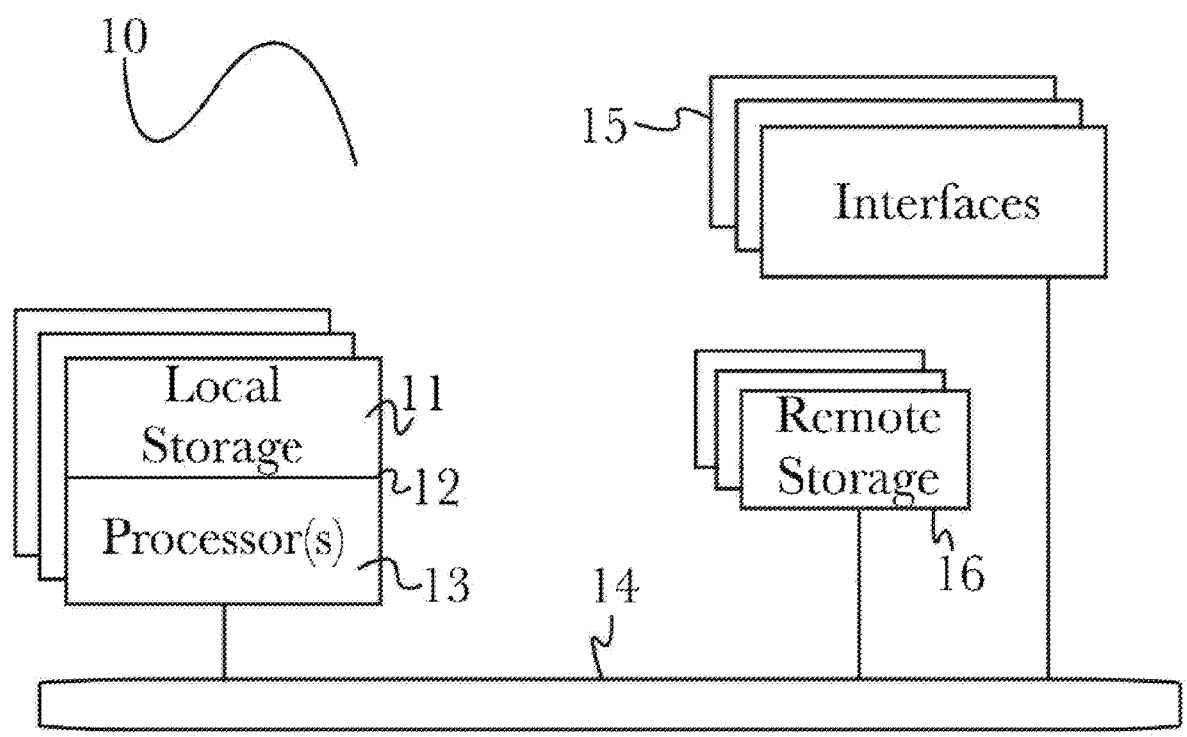
FIG. 4 illustrates one embodiment of a computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
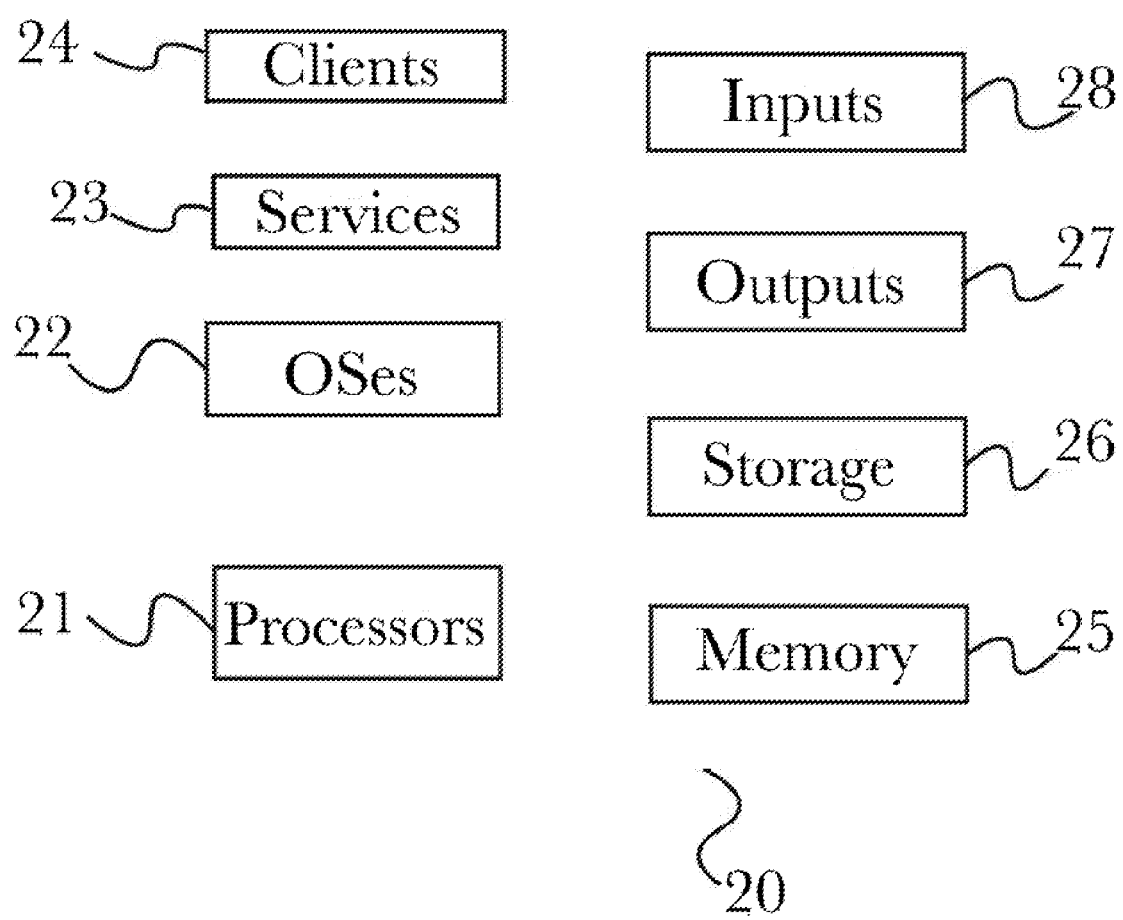
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
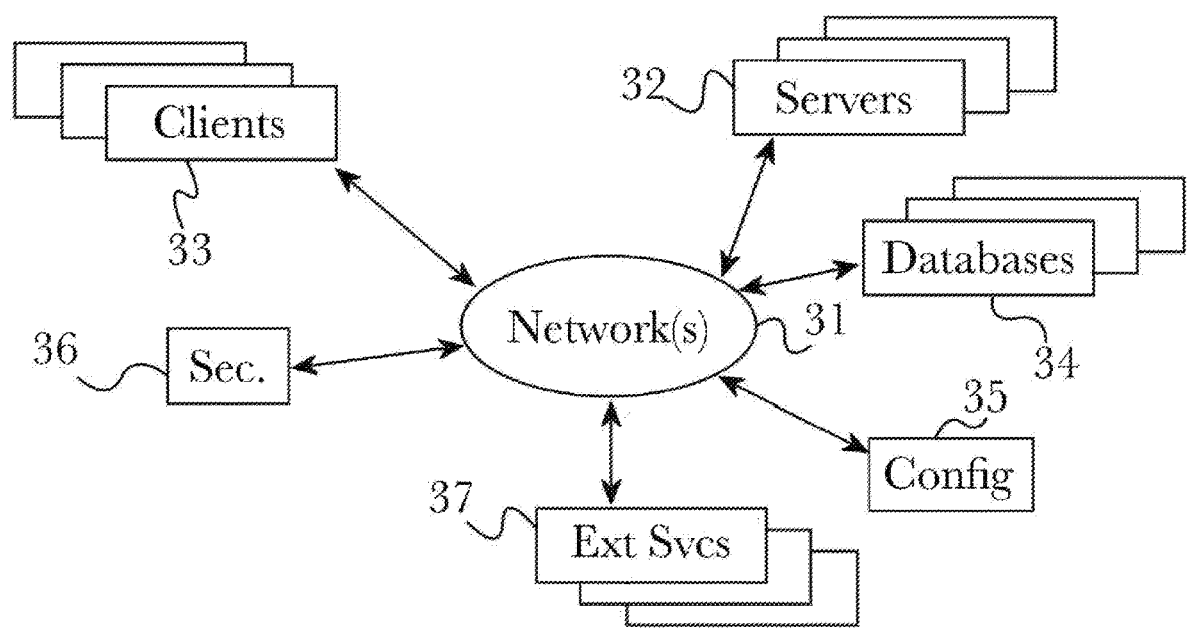
FIG. 6 illustrates components of a system architecture that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
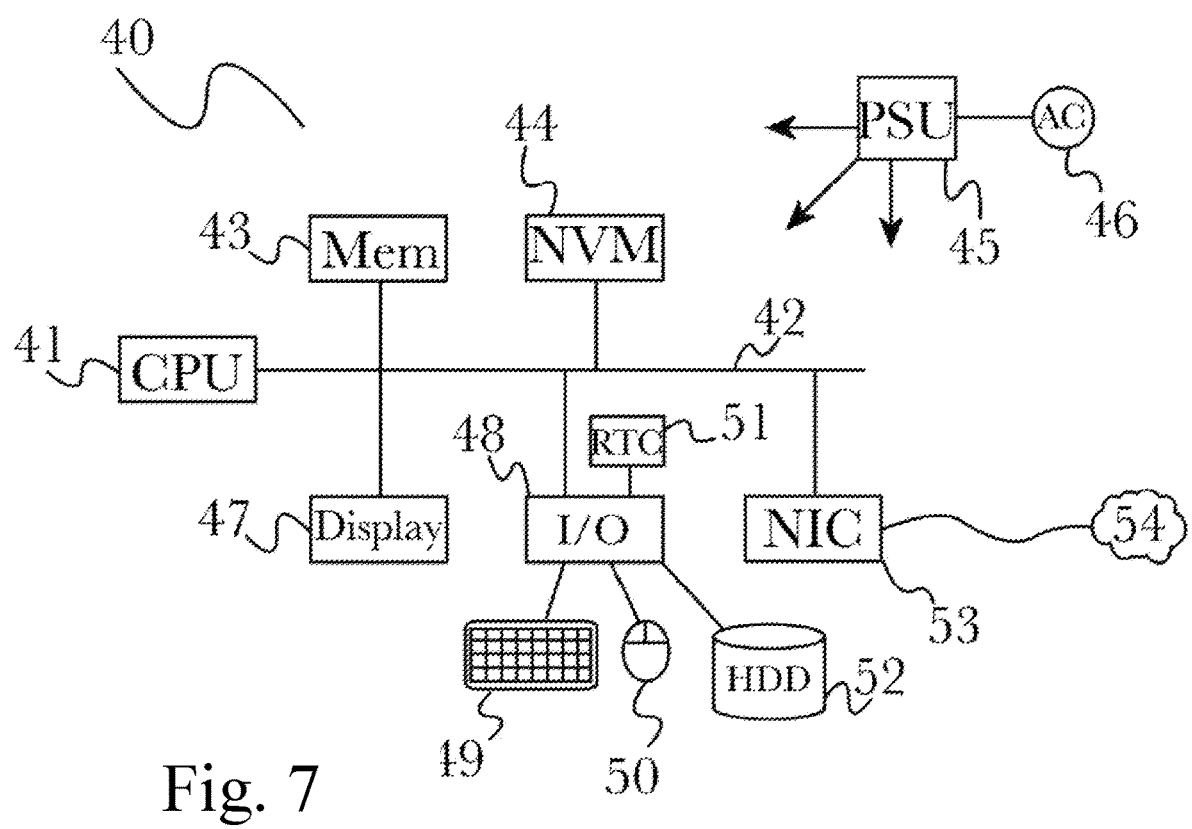
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A process for computing, in an on-demand converting environment, the yield, production time and/or cost of converting input inventory items into custom output inventory items that meet certain output requirements, wherein it is impractical to track the input and output inventory items via a bill of materials and/or part number system because of the amorphous nature of the input and output inventory items, the process comprising:
   receiving a request for a custom paper product comprising one or more output requirements for the custom paper product, the output requirements comprising physical characteristics comprising at least one of grade, thickness, basis weight, weight, linear measure, width, length, diameter, core, quality, condition and mill source, wherein a plurality of different input inventory items could be used to satisfy the request;

filtering, by a processor, a plurality of inventory items to identify a subset of input inventory items, the subset of input inventory items having minimum physical characteristics necessary for being converted into output inventory items having the one or more output requirements for the custom paper product, the physical characteristics comprising at least one of grade, thickness, basis weight, weight, linear measure, width, length, diameter, core, quality, condition and mill source, wherein each inventory item in the identified subset of input inventory items comprises at least one physical characteristic that is different than each other identified inventory item, the different physical characteristic being associated with at least one of each identified input inventory item having been partially converted in association with a prior conversion process and each identified input inventory item having different initial physical characteristics;

identifying at least one of a plurality of machine implemented converting processes capable of converting each of the identified input inventory items into the custom paper product;

identifying at least one of a plurality of converting machines capable of performing the at least one identified machine implemented converting process;

obtaining data from a computing device, the data comprising at least one of: output category attributes, machine speed attributes, and process cost attributes;

computing, in parallel by the processor, at least one of a plurality of expected yields, costs and production times for converting each of the identified input inventory items into the output inventory items having the one or more output requirements, wherein the computation is performed based on the obtained data;

identifying, in substantially real-time based on the computing, an input to output converting process and corresponding input inventory items associated with at least one of a greatest expected yield among the plurality of computed expected yields, a lowest cost among the plurality of computed expected costs, and a lowest production time among the plurality of computed expected production times; and converting, by at least one converting machine, at least one of the identified input inventory items into the output inventory items having the one or more output requirements, the at least one converting machine capable of performing the identified machine implemented converting process by receiving the at least one identified input inventory item as an input to the converting machine and executing the identified machine implemented converting process using the at least one converting machine, wherein the output inventory items resulting from the machine implemented converting process being created from input inventory items in a more efficient manner based on at least one of converting machine run time, converting machine speed, the amount of input inventory items needed, and the number of converting machines needed.

2. The process of claim 1, wherein the input inventory further comprise at least one of the following attributes: color, coating, print, perforation, embossing, lamination, folding and windowing.

3. The process of claim 1, wherein the output inventory items comprise at least one of the following attributes: color, coating, print, perforation, embossing, lamination, folding and windowing.

4. The process of claim 1, wherein the converting process is comprised of at least one of the following converting rules: rolls to rolls, rolls to sheets, rolls to patterns, sheets to sheets, sheets to patterns, and patterns to patterns.

5. The process of claim 1, wherein the process cost attributes are comprised of converting labor and overhead cost per hour, and machine speed attributes are comprised of at least one of: weight per unit of time, linear measure per unit of time, and items per unit of time.

6. The process of claim 5, wherein the machine speed attributes are obtained from a machine file, and the process cost attributes are obtained from a process file.

7. The process of claim 6, further comprising determining whether a multi-converting process or multi-machine process is required based on the machine file and the process file.

8. The process of claim 5, wherein the machine speed attributes include a cutoff length speed curve to adjust machine speed based on the output requirements of the custom paper product.

9. The process of claim 1, further comprising at least one of: validating the identified input inventory items are appropriate to produce the output requirements, at least one machine is capable of performing the identified converting process and making the one or more output requirements, validating that at least one converting process and at least one machine is appropriate to convert the identified input inventory items into one or more of the output requirements, and validating that a determined waste percentage is below a set threshold.

10. The process of claim 1, further comprising obtaining data from user defined tables.

11. The process of claim 10, wherein user defined tables are further comprised of user defined units.

12. The process of claim 10, wherein user defined tables are further comprised of metric to imperial conversion tables and/or imperial to metric conversion tables.

13. The process of claim 10, wherein user defined tables are further comprised of user defined grades specifying how basis weight is calculated.

14. The process of claim 1, wherein the machine attributes are comprised of at least one of run speed, startup time, max input items, input change time, and input removal time.

15. The process of claim 1, further comprising producing the output inventory items.

16. The process of claim 1, further comprising providing a report to a user, the report comprising at least one of yield calculations, expected costs and production time, including cost of material, waste and converting costs.

17. The process of claim 1, wherein the process can be completed without relying on an order entry number, part number or bill of materials.

18. The process of claim 1, wherein at least one of the output inventory items having the output requirements is designated as at least one of: a finished good inventory item ready to be sold and shipped, and an input inventory item to be stored in inventory for use in a future converting process.

19. The process of claim 1, wherein the custom paper product comprises a custom foil or custom film product.

\* \* \* \* \*